(12) United States Patent
Sikachev

(10) Patent No.: US 11,100,707 B2
(45) Date of Patent: Aug. 24, 2021

(54) COMPUTER GRAPHICS METHOD FOR TERRAIN RENDERING

(71) Applicant: SQUARE ENIX LIMITED, London (GB)

(72) Inventor: Peter Sikachev, Montréal (CA)

(73) Assignee: SQUARE ENIX LIMITED, London (GB)

( * ) Notice: Subject to any disclaimer, the term of this patent is extended or adjusted under 35 U.S.C. 154(b) by 0 days.

(21) Appl. No.: 16/595,133

(22) Filed: Oct. 7, 2019

(65) Prior Publication Data
US 2020/0143589 A1    May 7, 2020

(30) Foreign Application Priority Data

Nov. 7, 2018 (CA) ................................. CA 3023564

(51) Int. Cl.
| | |
|---|---|
| *G06T 15/00* | (2011.01) |
| *G06T 17/05* | (2011.01) |
| *G06T 15/04* | (2011.01) |
| *G06T 17/20* | (2006.01) |

(52) U.S. Cl.
CPC ............. *G06T 17/05* (2013.01); *G06T 15/04* (2013.01); *G06T 17/20* (2013.01)

(58) Field of Classification Search
CPC .......... G06T 15/04; G06T 17/05; G06T 17/20
See application file for complete search history.

(56) References Cited

U.S. PATENT DOCUMENTS

| | | | | |
|---|---|---|---|---|
| 2004/0096120 | A1* | 5/2004 | Tong | G06T 15/04 382/285 |
| 2009/0304236 | A1* | 12/2009 | Francini | G06T 17/05 382/109 |
| 2013/0169635 | A1* | 7/2013 | Carroll | G06T 17/20 345/423 |
| 2014/0333621 | A1* | 11/2014 | Hillesland | G06T 15/04 345/423 |

OTHER PUBLICATIONS

McGuire et al., Indirection Mapping for Quasi-Conformal Relief Texturing, Proceedings of the 2008 Symposium on Interactive 3D Graphics and Games, Feb. 2008, pp. 191-198 (Year: 2008).*

(Continued)

*Primary Examiner* — Charles Tseng
(74) *Attorney, Agent, or Firm* — Fenwick & West LLP

(57) ABSTRACT

A computer-implemented graphics processing method, which comprises providing an original set of vertices of a terrain mesh; producing a new set of vertices from the original set of vertices; and, for a given vertex in the original set of vertices: (i) obtaining texture coordinates for vertices in a subset of vertices in the new set of vertices that corresponds to the given vertex in the original set of vertices; and (ii) combining the obtained texture coordinates to obtain a texture coordinate for the given vertex in the original set of vertices. The combining may comprise determining a weighted sum of the obtained texture coordinates, and the weights may be the weights for which the given vertex in the original set of vertices is the centroid of a polygon formed by the corresponding vertices in the new set of vertices.

36 Claims, 17 Drawing Sheets

(56) References Cited

OTHER PUBLICATIONS

European Patent Office, Extended European Search Report, European Patent Application No. 19205445.0, dated Feb. 5, 2020, 12 pages.
Nicholson, K. "GPU Based Algorithms for Terrain Texturing." University of Canterbury, Nov. 6, 2008, pp. 1-40.
Sander, P. V. et al. "Texture Mapping Progressive Meshes." SIGGRAPH '01: Proceedings of the $28^{th}$ Annual Conference on Computer Graphics and Interactive, Aug. 12-17, 2001, pp. 409-416.
Tian, D. et al. "Upsampling Technique in Multi-Resolution Texture Mapping for Real-Time Terrain Rendering." 2008 Second International Symposium on Intelligent Information Technology Application, Dec. 20-22, 2008, pp. 899-903.
Winberg, O. "Examining Automatic Texture Mapping of Arbitrary Terrains." Master Thesis, Mälarden University, Apr. 2011, pp. 1-51.
Zirr, T. et al. "Distortion-Free Displacement Mapping." Computer Graphics Forum, vol. 38, No. 8, Nov. 2019, pp. 53-62.

\* cited by examiner

COMPUTER GRAPHICS METHOD FOR TERRAIN RENDERING

CROSS-REFERENCE TO RELATED APPLICATION

This application claims priority to Canadian patent application no. 3,023,564 filed on Nov. 7, 2018, which is incorporated by reference herein in its entirety.

FIELD

The present disclosure is related in general to computer graphics processing and, in particular, to obtaining texture coordinates for vertices of a 3D terrain mesh.

BACKGROUND

Terrain rendering is one of the major challenges in modern video games. One of the most widespread techniques for terrain rendering is the so-called heightmap-based approach. The idea behind this approach is that the terrain is rendered as a uniform mesh grid, where each vertex is displaced in the vertical direction according to the height value read from the heightmap. The terrain is then textured by simply projecting textures top-down (sometimes with a certain tiling factor). A problem with this approach is that such an implicit parameterization can be highly irregular in the world space. This is observed in-game as accentuated stretching of texture data along the slopes of the terrain.

Historically, video game creators have attempted to address this problem by triplanar mapping: effectively, projecting a texture from 3 directions and blending the data. This technique may yield somewhat of an improvement, but is incorrect, slow, and incompatible with terrain splatting/virtual texturing techniques. As such, an improved solution for terrain rendering would be welcomed by the industry.

SUMMARY

Thus, according to a first broad aspect, there is provided a computer-implemented graphics processing method, which comprises providing an original set of vertices of a terrain mesh; producing a new set of vertices from the original set of vertices; and, for a given vertex in the original set of vertices: (i) obtaining texture coordinates for vertices in a subset of vertices in the new set of vertices that corresponds to the given vertex in the original set of vertices; and (ii) combining the obtained texture coordinates to obtain a texture coordinate for the given vertex in the original set of vertices.

The combining may comprise determining a weighted sum of the obtained texture coordinates, and the weights may be the weights for which the given vertex in the original set of vertices is the centroid of a polygon formed by the corresponding vertices in the new set of vertices According to another broad aspect, there is provided computer-readable storage media storing an original set of vertices and computer-readable instructions which, when executed by a processor of a computing entity, cause the computing entity to carry out a method that comprises: providing an original set of vertices of a terrain mesh; producing a new set of vertices from the original set of vertices; and for a given vertex in the original set of vertices: obtaining texture coordinates for vertices in a corresponding subset of the new set of vertices; and combining the obtained texture coordinates to obtain a texture coordinate for the given vertex.

According to another broad aspect, there is provided a computer-implemented graphics processing method, comprising: providing a heightmap that maps terrain vertices to associated height values; providing a mapping between texture coordinates and the terrain vertices; for a given one of the terrain vertices, obtaining a texture coordinate based on the mapping and the heightmap, the texture coordinate being different from that which the mapping associates with the given one of the terrain vertices; and storing information regarding the obtained texture coordinate in memory in association with the given one of the terrain vertices.

According to another broad aspect, there is provided computer-readable storage media storing a heightmap that maps terrain vertices to associated height values, a mapping between texture coordinates and the terrain vertices and computer-readable instructions which, when executed by a processor of a computing entity, cause the computing entity to carry out a method that comprises, for a given one of the terrain vertices: obtaining a texture coordinate based on the mapping and the heightmap, the texture coordinate being different from that which the mapping associates with the given one of the terrain vertices; and storing information regarding the obtained texture coordinate in memory in association with the given one of the terrain vertices.

BRIEF DESCRIPTION OF THE DRAWINGS

Reference is now made to the drawings, in which.

The drawings are provided for illustrative purposes and only intended to show certain embodiments, which are to be considered non-limiting.

DETAILED DESCRIPTION

Figure 1:
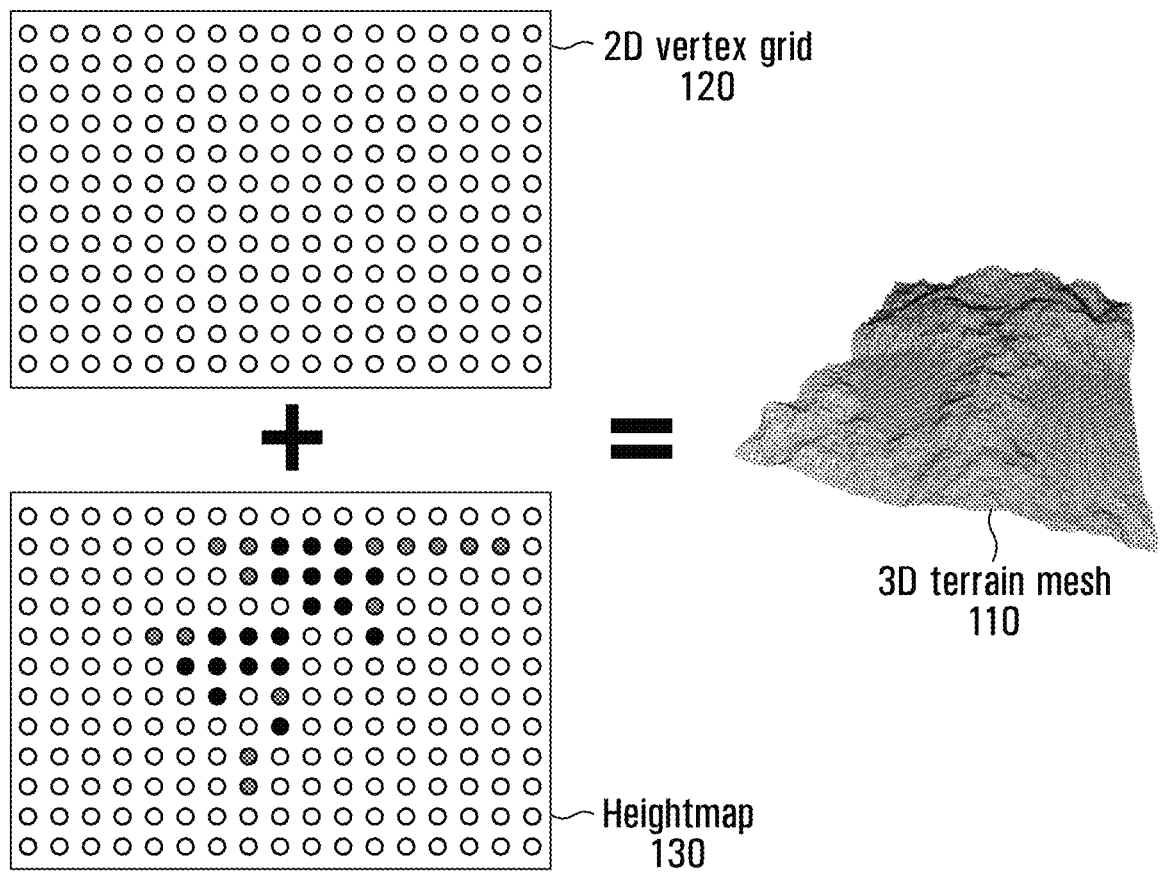
FIG. 1 is a diagram illustrating how a 3D terrain mesh can be obtained from a 2D vertex grid and heightmap.

With reference to FIG. 1, a "3D terrain mesh" 110 refers to the 3D surface of terrain, and is characterized by vertices with no overhang, i.e., they are non-overlapping in height. As such, the 3D terrain mesh 110 can be expressed as a grid of 2D vertices (referred to a "2D vertex grid") 120 in combination with an associated heightmap 130. The heightmap 130 can be viewed as an array of values each indicating the height of the terrain at a corresponding vertex in the 2D vertex grid 120.

Figure 2:
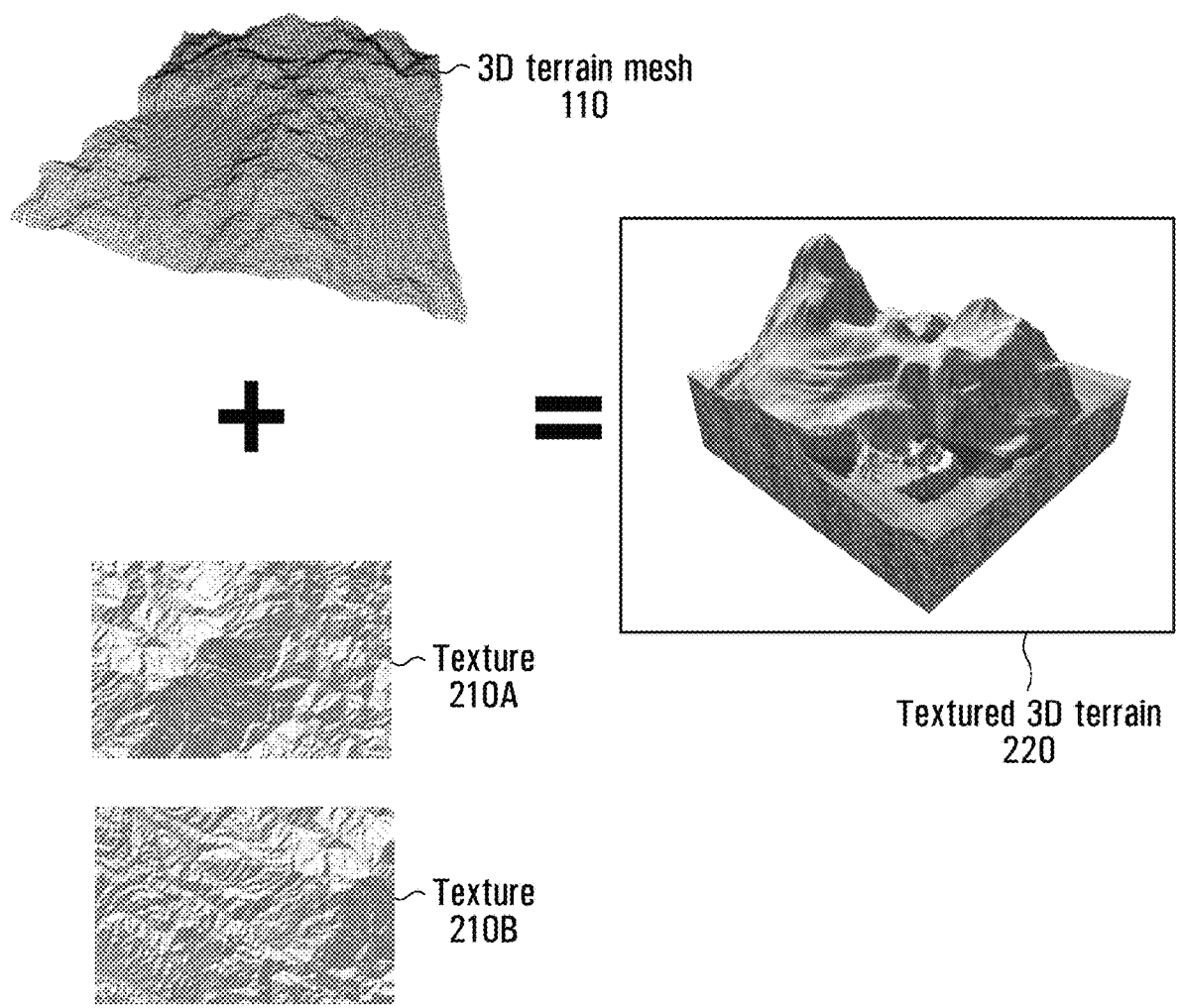
FIG. 2 is a diagram illustrating how a textured 3D terrain can be obtained by texture mapping.

Adding image detail to the 3D terrain mesh 110 involves texture mapping. As such, with reference now to FIG. 2, the image detail may come in the form of one or more textures such as textures 210A, 210B. Each texture is a set of coordinates in 2D space (also known as (u,v) space), each with its own value. Each of the textures 210A, 210B is then "applied" (or "mapped") to a portion of the 3D mesh 110 to produce textured 3D terrain 220. For example, applying texture 210A to a portion of the 3D terrain mesh 110 can involve associating individual vertices of the 2D vertex grid 120 with individual coordinates of the texture 210A. The same is done for texture 210B and other textures. In this way, each vertex in the 2D vertex grid 120 (and therefore each vertex in the 3D terrain mesh 110) acquires a color value.

Individual ones of the textures 210A, 210B may be the same size as the 2D vertex grid 120, or they may be larger or smaller. Individual ones of the textures 210A, 210B may be stretched or compressed (and possibly also rotated) as it they are mapped to the 2D vertex grid 210. Various interpolation techniques can be used for the aforesaid stretching or compressing if there is not a 1:1 correspondence between texture coordinates (in a particular texture) and vertices (in the 2D vertex grid).

Figure 3:
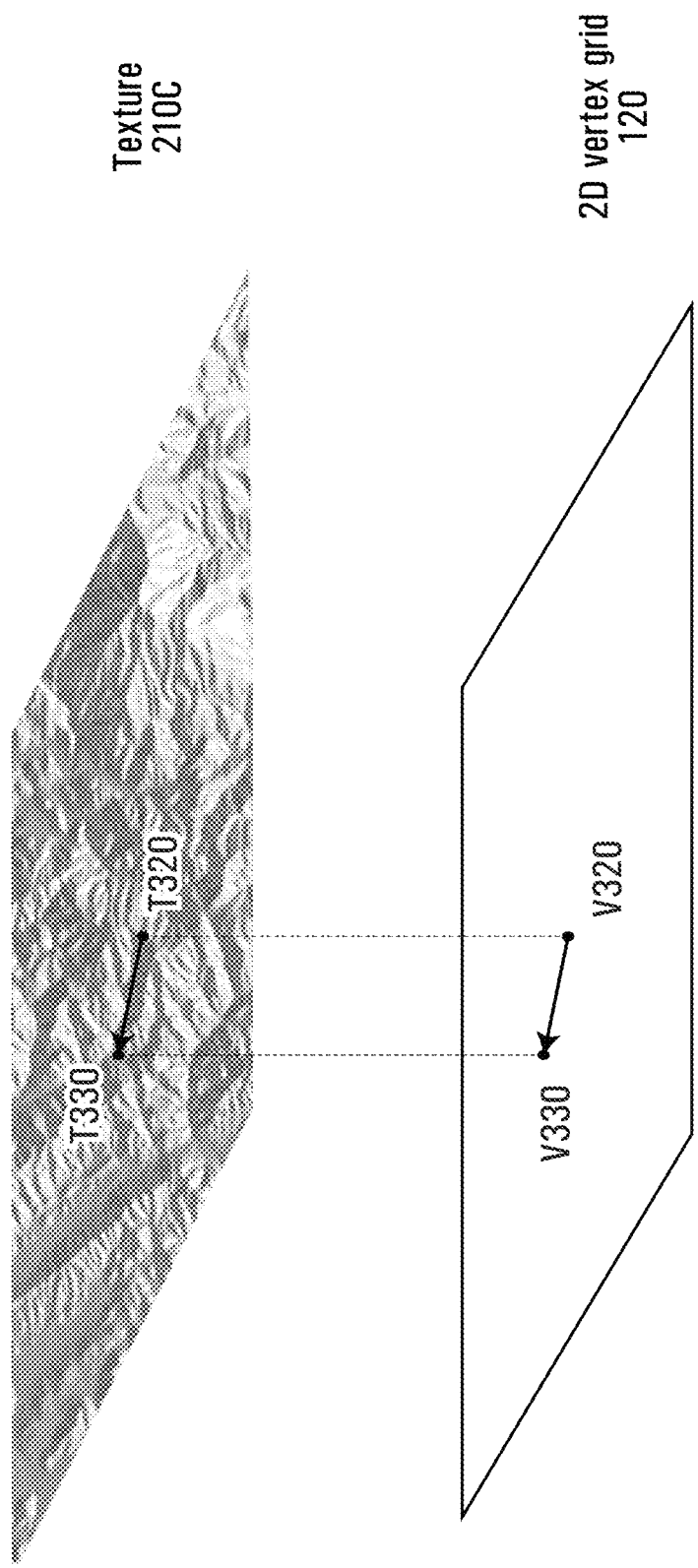
FIG. 3 is a diagram demonstrating an implicit mapping between a texture and a 2D vertex grid.

FIG. 3 shows the simple case where a texture 210C is the same size as the 2D vertex grid 120 and there is no compression, expansion or rotation of the texture 210C as it is mapped to the 2D vertex grid 120. The texture 210C is simply "projected" onto the 2D vertex grid 120. As such, the vector from, say, vertex V320 to vertex V330 has the same size and orientation in 2D as the vector from texture coordinate T320 (corresponding to vertex V320) to texture coordinate T330 (corresponding to vertex V330). This is a simple example of an "implicit" mapping according to which the texture coordinates in the texture 210C can be derived procedurally from (e.g., by a linear transformation of) the X-Y coordinates of the vertices in the 2D vertex grid 120. In the simplest case of no compression, expansion or rotation, as in the example illustrated in FIG. 3, this linear transformation is unity.

According to certain embodiments of the present disclosure, there is provided a texture mapping process that implements a specific way of mapping the texture 210C to the 2D vertex grid 120. The texture mapping process of certain embodiments of the present disclosure may be performed in a pixel shader using interpolated texture coordinates from a vertex shader; both pixel and vertex shaders are stages of a graphics pipeline and may be executed by a graphics processing unit (GPU). The texture mapping process of certain embodiments of the present disclosure results in a new mapping between the texture 210C and the 2D vertex grid 120. The new mapping is not itself an implicit mapping, meaning that the texture coordinates in the texture 210C are not derived by a mere linear transformation of the coordinates of the vertices in the 2D vertex grid 120. The new mapping may provide for improved realism when rendering the 3D terrain mesh 110, and in particular where the heightmap 130 is indicative of steep slopes.

Figure 4:
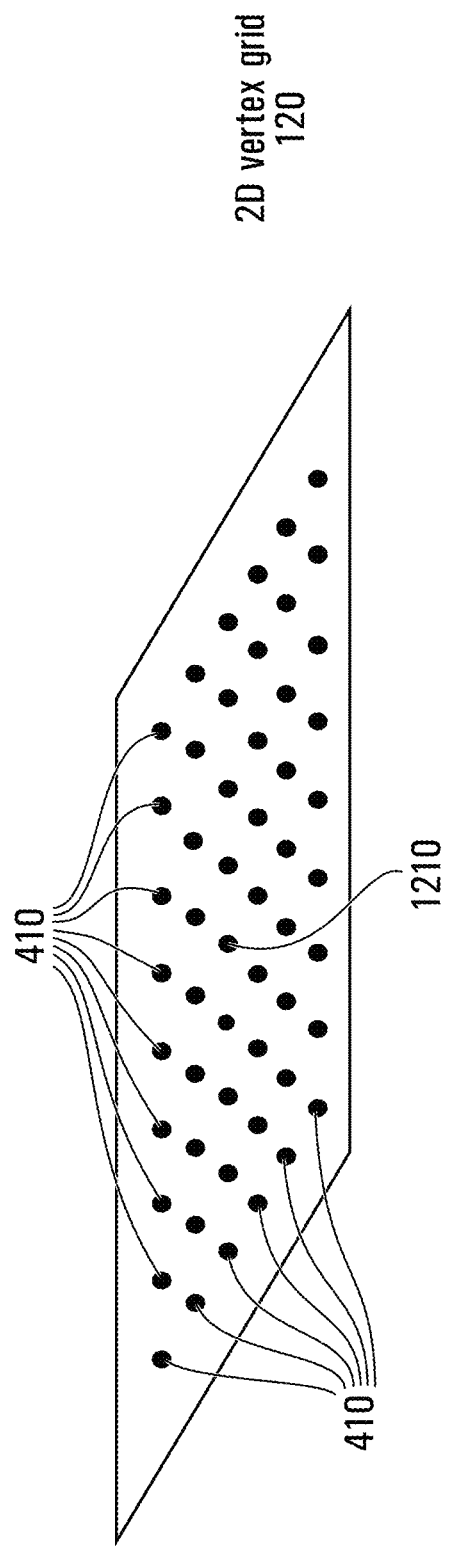
FIG. 4 is a diagram illustrating an original set of vertices in a 2D vertex grid.
Figure 5:
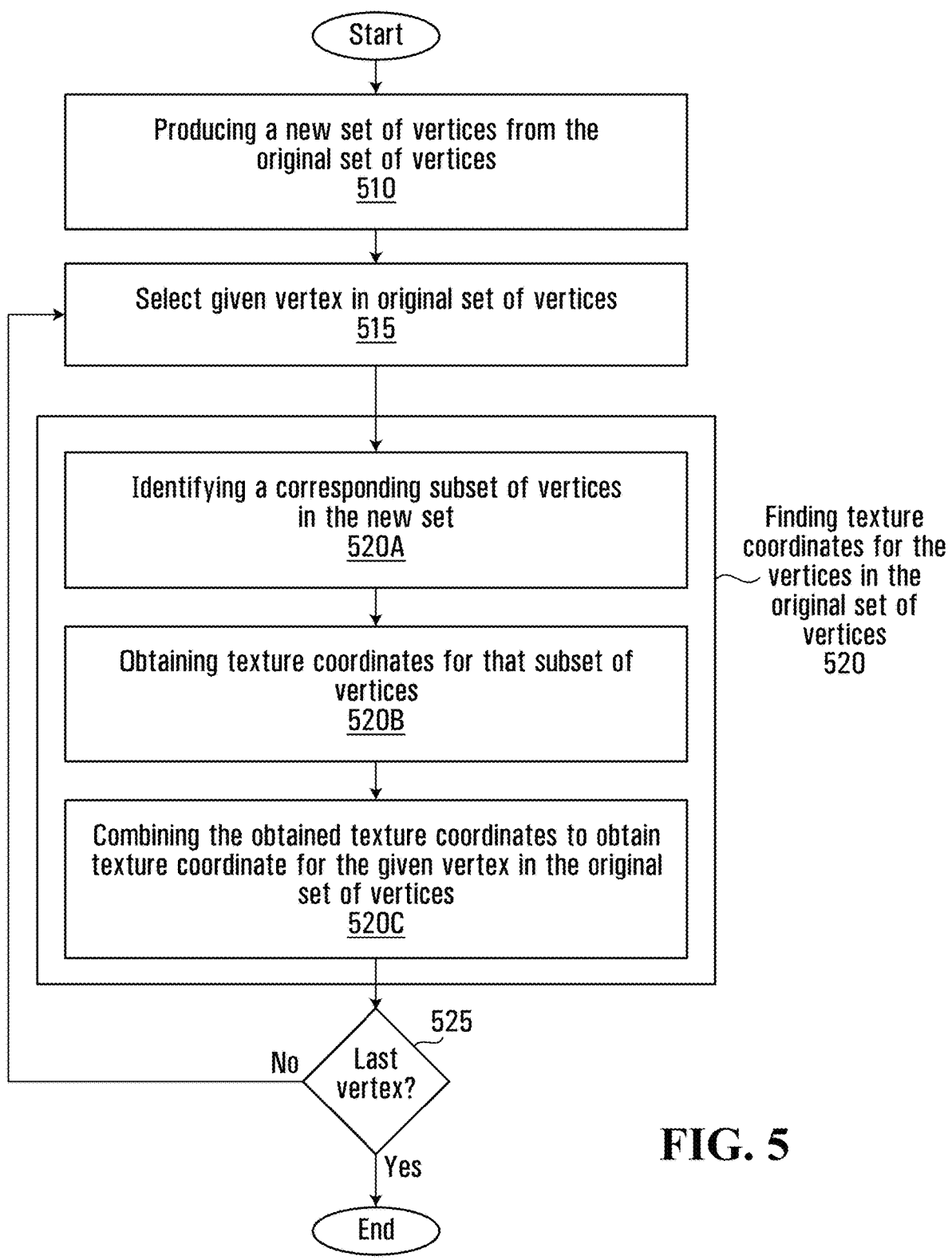
FIG. 5 is a flowchart showing certain steps involved in obtaining texture coordinates for 2D vertices that make up a 3D terrain mesh, according to a non-limiting embodiment.

Therefore, and with reference to FIGS. 4 and 5, one way to achieve the new mapping for an original set of vertices 410 in the 2D vertex grid 120 is by producing a new set of vertices from the original set of vertices (STEP 510) and then finding texture coordinates for the vertices in the original set of vertices (STEP 520). Each of steps 510 and 520 will now be described in greater detail.

Step 510

Figure 6A:
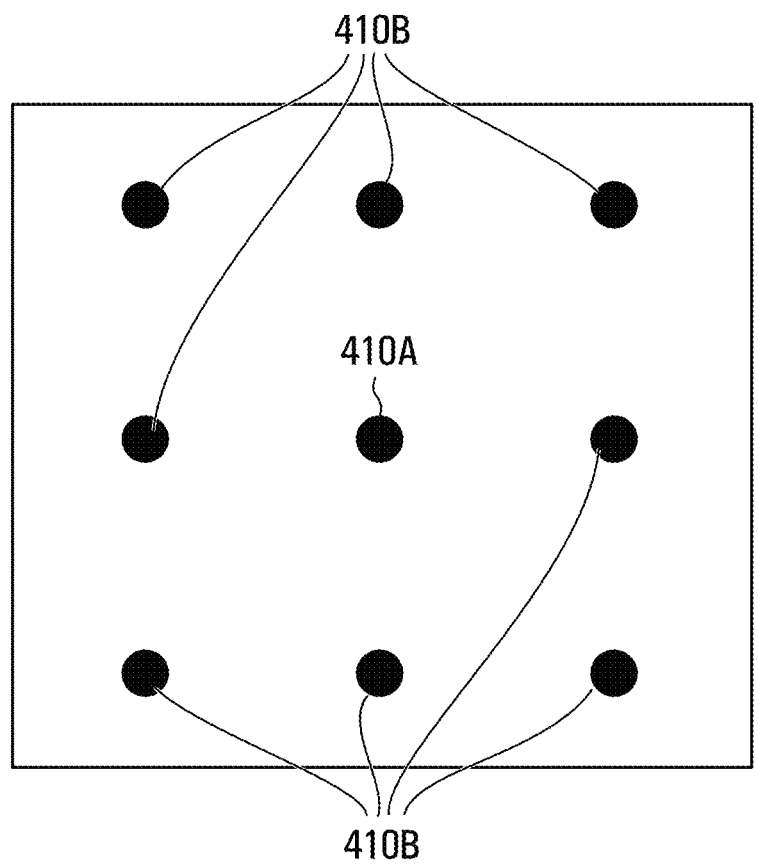
FIG. 6A is a diagram illustrating the X-Y position of a given vertex relative to neighboring vertices.
Figure 7:
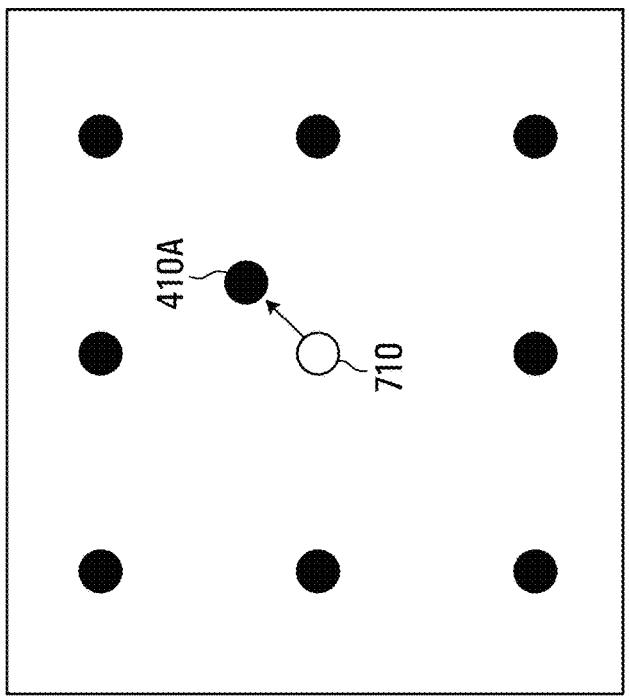
FIG. 7 is a diagram showing a change in position of the given vertex in FIG. 6A, according to a non-limiting embodiment.

Producing a new set of vertices from the original set of vertices 410 may include computing a revised 2D position (or revised X-Y coordinates) for at least some of the vertices in the original set of vertices 410. With reference to FIGS. 6A and 7, the revised 2D position for a particular vertex 410A in the original set of vertices 410 can be computed based on a distance, in 3D space, between point 610A and each of N points 610B. Point 610A is a point in 3D space corresponding to the particular vertex 410A elevated by the heightmap 130.

As for the N points 610B, there are various ways to choose them. For example, the N points 610B may be points in 3D space corresponding to N vertices 410B in the original set of vertices 410 that are "in the neighborhood" of the particular vertex 410A, also elevated by the heightmap 130. To select N vertices 410B as being "in the neighborhood of" the particular vertex 410A, this could mean the N vertices in the original set of vertices 410 having the smallest distance to the particular vertex 410A within the 2D vertex grid 120. Alternatively, if the 2D vertex grid 120 is treated as a texture, then neighbors to a given vertex (i.e., pixel in the texture) are other vertices (pixels) that share an edge or a corner therewith. Other metrics could of course be used to choose the N 410B in the original set of vertices 410 that are "in the neighborhood" of the particular vertex 410A.

The value of N may be any integer greater than or equal to 2, such as, for example, 8 as shown in FIGS. 6A and 7 for the particular vertex 410A, where there are 8 neighboring vertices 410B. In computing the revised position for the particular vertex 410A in the original set of vertices 410, one may construct N vectors (in 3D) joining the particular corresponding point 610A and the N points 610B, and sum these 3D vectors together to give a resultant 3D vector whose 2D component indicates by how much the particular vertex 410A has moved. However, other constraints are possible. For example, N may designate the maximum number of neighboring vertices, where the number of neighboring vertices included in the computation may be less than N if a certain maximum distance is exceeded.

Figure 6B:
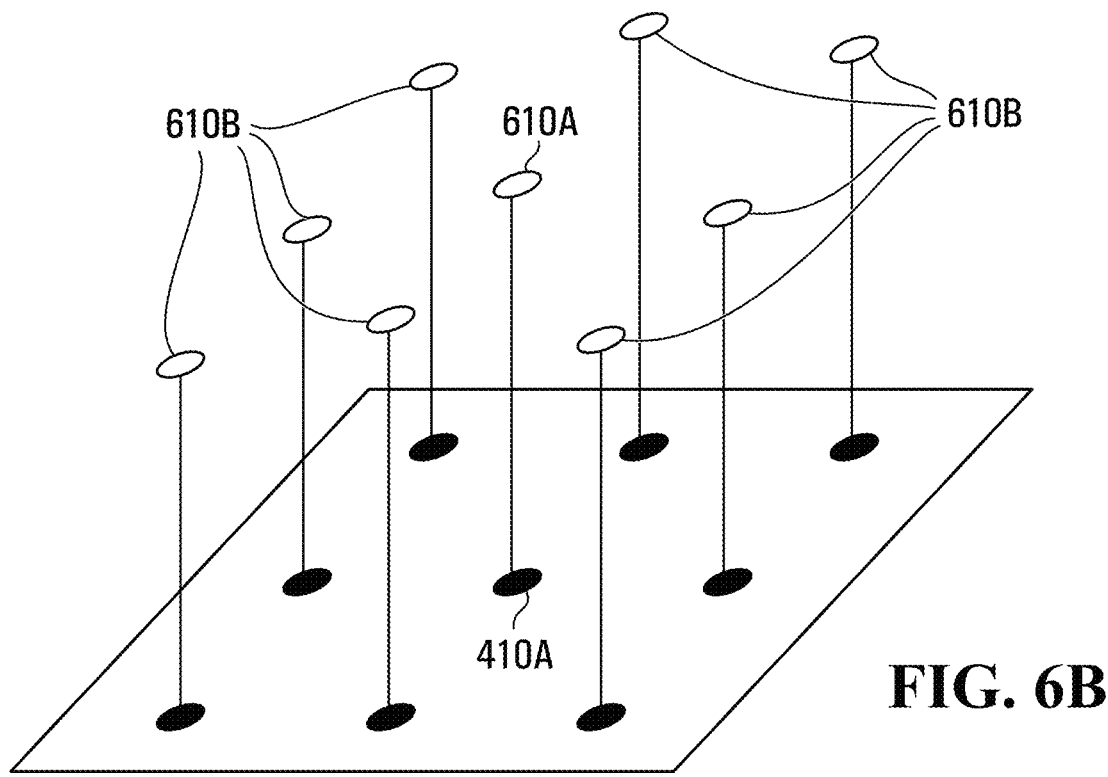
FIG. 6B is a diagram showing 3D points corresponding to the vertices in FIG. 6A.

As a result of the computation of the revised position for the particular vertex 410A in the original set of vertices 410, the particular vertex 410A will either be repositioned (acquire a new 2D position) or it will not. In other words, the revised position within the 2D vertex grid 120 may be a different position or the same position. FIG. 6B shows the case where the particular vertex 410A has been repositioned within the 2D vertex grid 120, wherein the previous position occupied by the particular vertex 410A is shown as an empty circle 710.

The above revised position calculation technique may be performed for all vertices in the original set of vertices 410. There are different techniques of carrying this out. A first technique is to perform the revised position calculation sequentially for all vertices in the original set of vertices 410. A second technique is to perform the revised position calculation in parallel for sub-groups (or "batches") of vertices in the original set of vertices 410. The vertices in each batch may be selected so as not to include any of the vertices that could have an influence on the revised position of the vertices in the batch. Practically speaking, one can create M batches each including 1/$M^{th}$ of all vertices (somewhat interspersed in the 2D vertex grid 12) and then perform the revised position calculation sequentially, one batch at a time; however, the revised position calculations themselves can be done in parallel for the vertices in each batch. In some embodiments, the number of batches, i.e., M, can be a positive integer power of 2, namely either 2, 4, 8, etc. It may be that the more neighbors influence the calculation of a revised position for the vertices in the original set of vertices 410, the more batches will be needed to preserve stability of the computations, i.e., a viable value for M may be dependent on the value of N.

The aforementioned technique may be carried out over a number of iterations. That is, once the above revised position calculation has been performed for all vertices in the original set of vertices 410, the aforementioned technique may be reiterated for all vertices in the original set of vertices 410, and repeated a number of times. This number of times may be fixed without there being a particular limitation on the number (e.g., 2, 5, 10, 50 or 100 times), or it may be performed as many times as necessary so that the revised position changes by no more than a threshold amount (e.g., 1%, 5%, 10%, or even by a certain absolute distance in the 3D world space), for at least a threshold percentage of vertices (e.g., 75%, 80%, 90%, 99%, etc., this percentage being the percentage of vertices being processed overall in the original set of vertices 410 or only within each batch).

Figure 8:
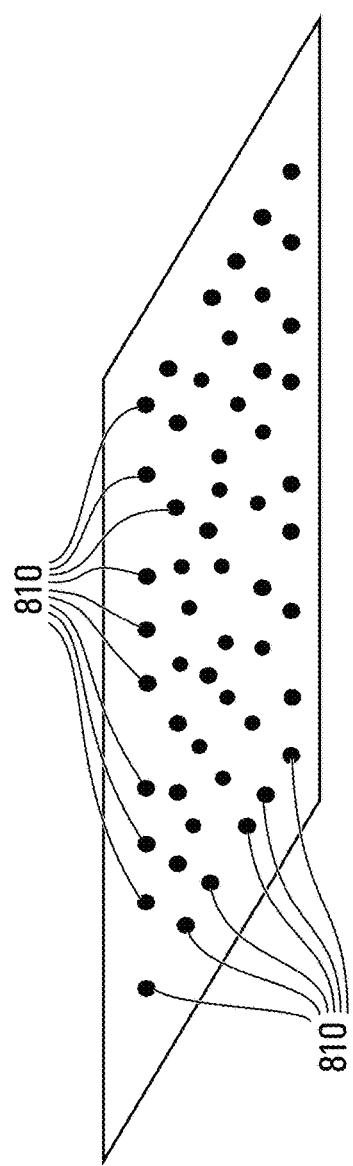
FIG. 8 is a diagram illustrating a new set of vertices in a 2D vertex grid, wherein the location of certain vertices in the original 2D vertex grid of FIG. 4 has changed, according to a non-limiting embodiment.
Figure 9:
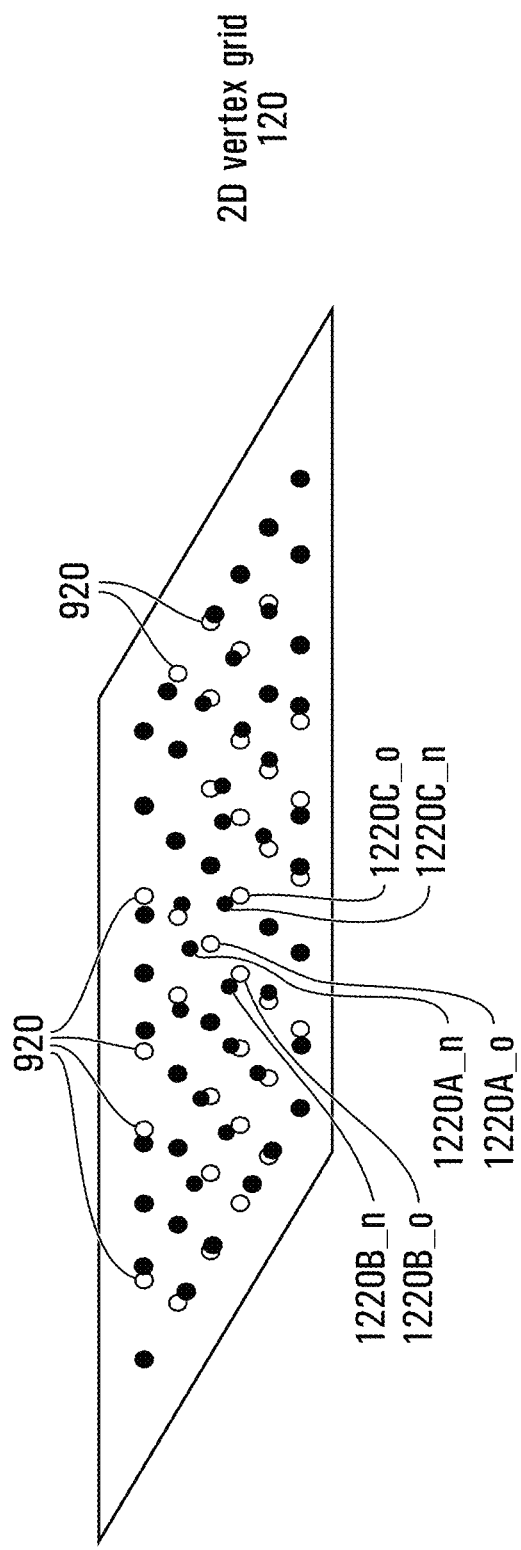
FIG. 9 is a diagram similar to that of FIG. 8, in which the previous locations of those vertices that have changes are shown as lighter colored circles.
Figure 10A:
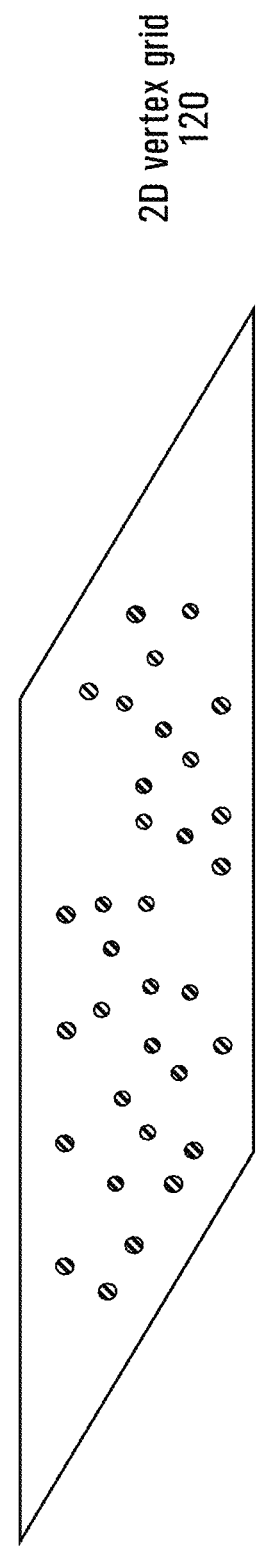
FIG. 10A is a diagram similar to that of FIG. 8, in which only those vertices that have moved are shown in the 2D vertex grid.
Figure 10B:
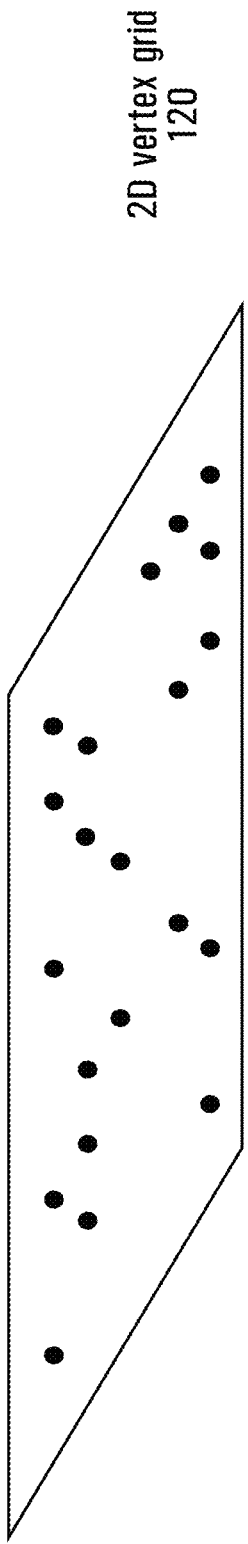
FIG. 10B is a diagram similar to that of FIG. 8, in which only those vertices that have not moved are shown in the 2D vertex grid.
Figure 11:
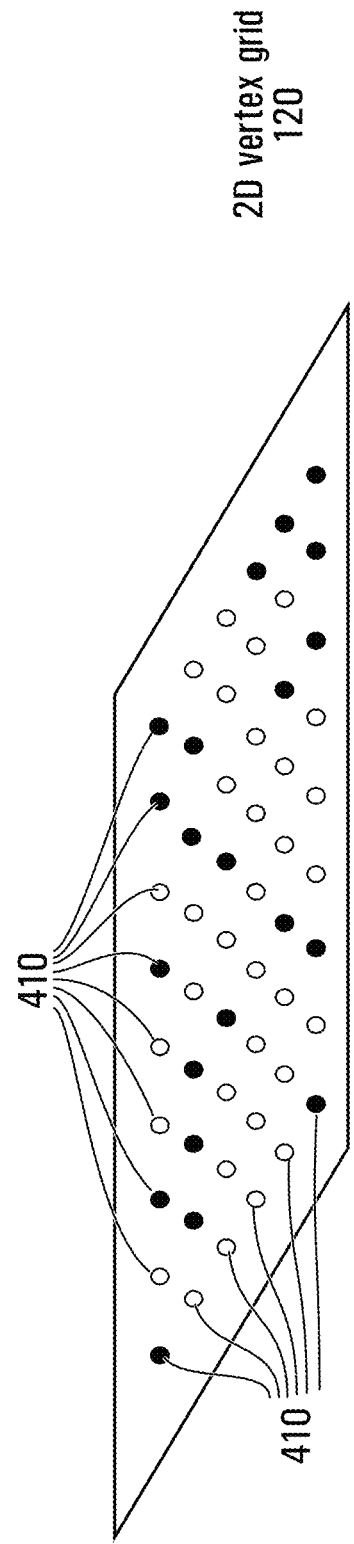
FIG. 11 displays a combination of the diagrams in FIGS. 10A and 10B, in which the vertices that have moved are shown in lighter colored circles and the vertices that have not moved are shown in dark circles.

FIG. 8 shows the new set of vertices 810, namely the 2D positions of the vertices in the original set of vertices 410 after the revised position calculation of step 510, with the net effect being that some of the vertices will have moved (i.e., changed positions in 2D). FIG. 9 identifies in empty circles 920 the former positions of those vertices of the original set of vertices 410 that have moved to new 2D positions as a result of step 510. FIG. 10A shows the vertices that did indeed move as a result of step 510, whereas FIG. 10B shows the vertices from the old set 410 that did not move as a result of step 510. For completeness, FIG. 11 shows the original 2D vertex grid 120 including the original set of vertices 410, in which the vertices that ultimately moved are shown as light circles.

It will be appreciated that the new set of vertices formed by the aforementioned technique, whereby a vertex is "moved" by an amount that is the weighted sum of the 3D distance to its N nearest neighbors, may give the appearance of being more uniformly spread out in 3D space. That is to say, when looked at in the 3D space, the lengths of the edges incident to the vertices in the new set 810 (taking into consideration the heightmap 130) are more uniform than the lengths of the edges incident to the vertices in the original set of vertices 410 (again, taking into consideration the same heightmap 130).

Figure 20:
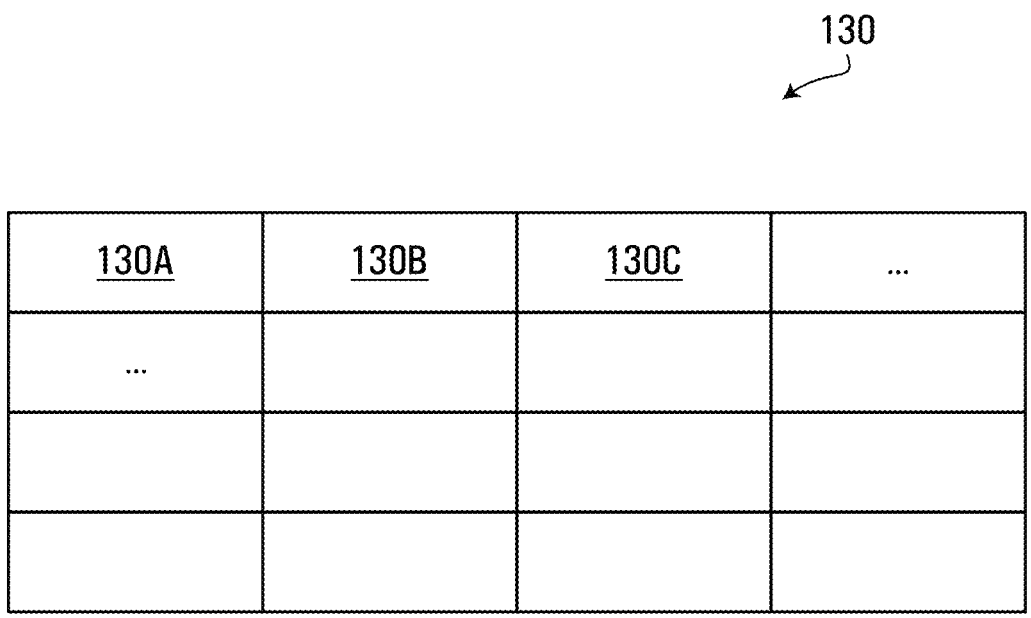
FIG. 20 shows a heightmap broken down into patches.

It should be appreciated that overall, the 3D terrain 220 may be separated into smaller tiles (or, more generally, "terrain patches", which may be non-rectangular), e.g., for more efficient bandwidth usage. Specifically, and as shown in FIG. 20, the separation may be at the level of the heightmap 130 to create multiple heightmap patches 130A, 130B, etc., corresponding to similar patches containing vertices from the original set of vertices 410. As such, one can appreciate that there will be vertices in the original set of vertices 410 that are shared by three or more patches (called "corner vertices") and vertices shared by exactly two patches (called "edge vertices"). These corner vertices and edge vertices may be treated differently than other vertices in the original set 410 when creating the new set of vertices 810.

For example, to preserve visual continuity, corners vertices may be constrained to remain fixed in position, i.e., a revised position is not computed for the corner vertices. As for edge vertices that are on an edge between two corner vertices, these may be constrained to remain on that same edge. In other words, the revised position for a particular vertex in the original set of vertices 410 that is an edge vertex may remain on that same edge. This may also preserve visual continuity across borders of neighboring terrain patches.

Step 520

A method of finding texture coordinates for the vertices in the original set of vertices 410 can involve going through the original set of vertices 410 and, for each given "old" vertex in the original set of vertices 410 (see steps 515 and 525), performing sub-steps 520A (identifying a corresponding subset of vertices in the new set of vertices), 520B (obtaining texture coordinates for that subset of vertices) and 520C (combining the obtained texture coordinates to obtain the final texture coordinate for the given "old" vertex). Each of these sub-steps is now described in greater detail, with reference back to FIG. 4, in which a given "old" vertex 1210 in the original set of vertices 410 is identified as being selected for implementation of the aforementioned sub-steps of step 520.

In an alternative embodiment of Step 520, one may start with each particular one of the vertices in the new set of vertices 810, determine whether it qualifies as a surrounding vertex for any vertex in the original set of vertices 410 that has not been processed (i.e., whether, for any vertex in the original set of vertices 410 that has not yet been processed, the corresponding subset of vertices would include the particular vertex in the new set of vertices 810). If yes, then for each such "old" vertex, the method includes (i) marking it as "processed" and (ii) determining the other vertices in the new set of vertices 810 that are also part of the corresponding subset for the "old" vertex in question, and then performing sub-steps 520B and 520C as will be described below, and then finally moving on to the next particular vertex in the new set of vertices 810 until all vertices in the new set of vertices 810 have gone through the method.

Sub-Step 520A

Figure 12:
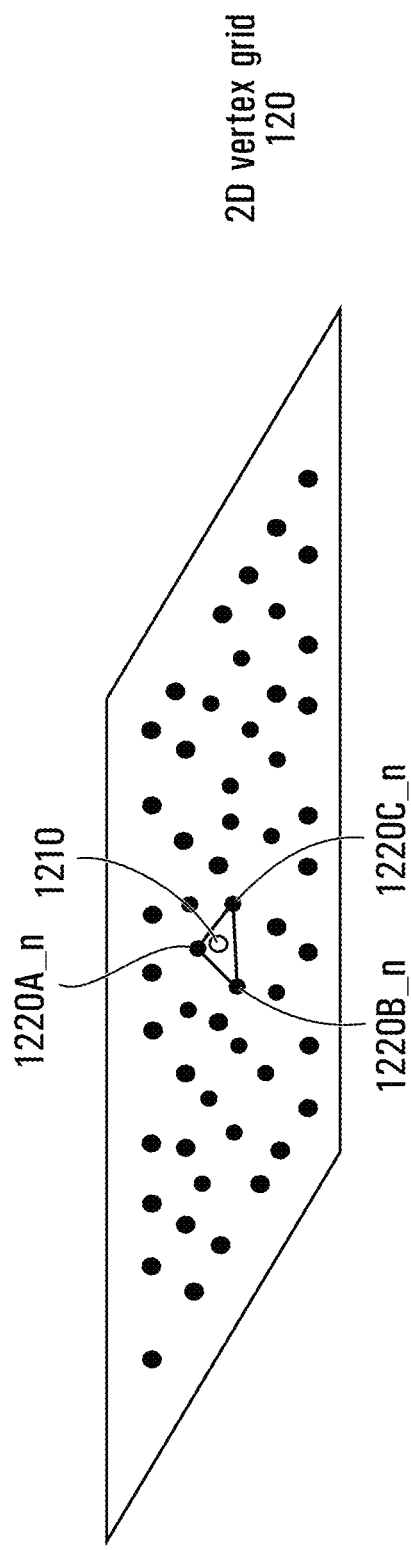
FIG. 12 is a diagram similar to that of FIG. 8, showing a given vertex in the original set of vertices surrounded by a subset of vertices in the new set of vertices.

In this sub-step, a "corresponding subset" of vertices in the new set of vertices 810 is found for the given vertex 1210 in the original set of vertices 410. With reference to FIG. 12, the corresponding subset of vertices can include at least three vertices 1220A_n, 1220B_n, 1220C_n, and these may be the three vertices in the new set of vertices 810 that are "closest" to the given vertex 1210 and together surround the given vertex 1210. The definition for "closest" may vary in from one implementation to another. In some implementations, there may be more than three vertices in the corresponding subset of vertices. In addition to Iterating over all the vertices to find each vertex' "corresponding subset", one may use a gradient descent (which may be faster) or one may render the transformed vertex mesh in 2D using the graphics pipeline and relying on rasterization.

It should be appreciated that the given vertex 1210 (in the original set of vertices 410) may or may not move to a new position in the new set of vertices 810 as a result of the revised position calculation of step 510.

Sub-Step 520B

In this sub-step, texture coordinates for the aforementioned corresponding subset of vertices (including vertices 1220A_n, 1220B_n, 1220C_n) are obtained. Thus could be achieved by obtaining the positions of vertices 1220A_n, 1220B_n and 1220C_n in the original set of vertices 410 and then obtaining the texture coordinates in the texture 210C corresponding to those original positions under an implicit mapping.

Figure 13:
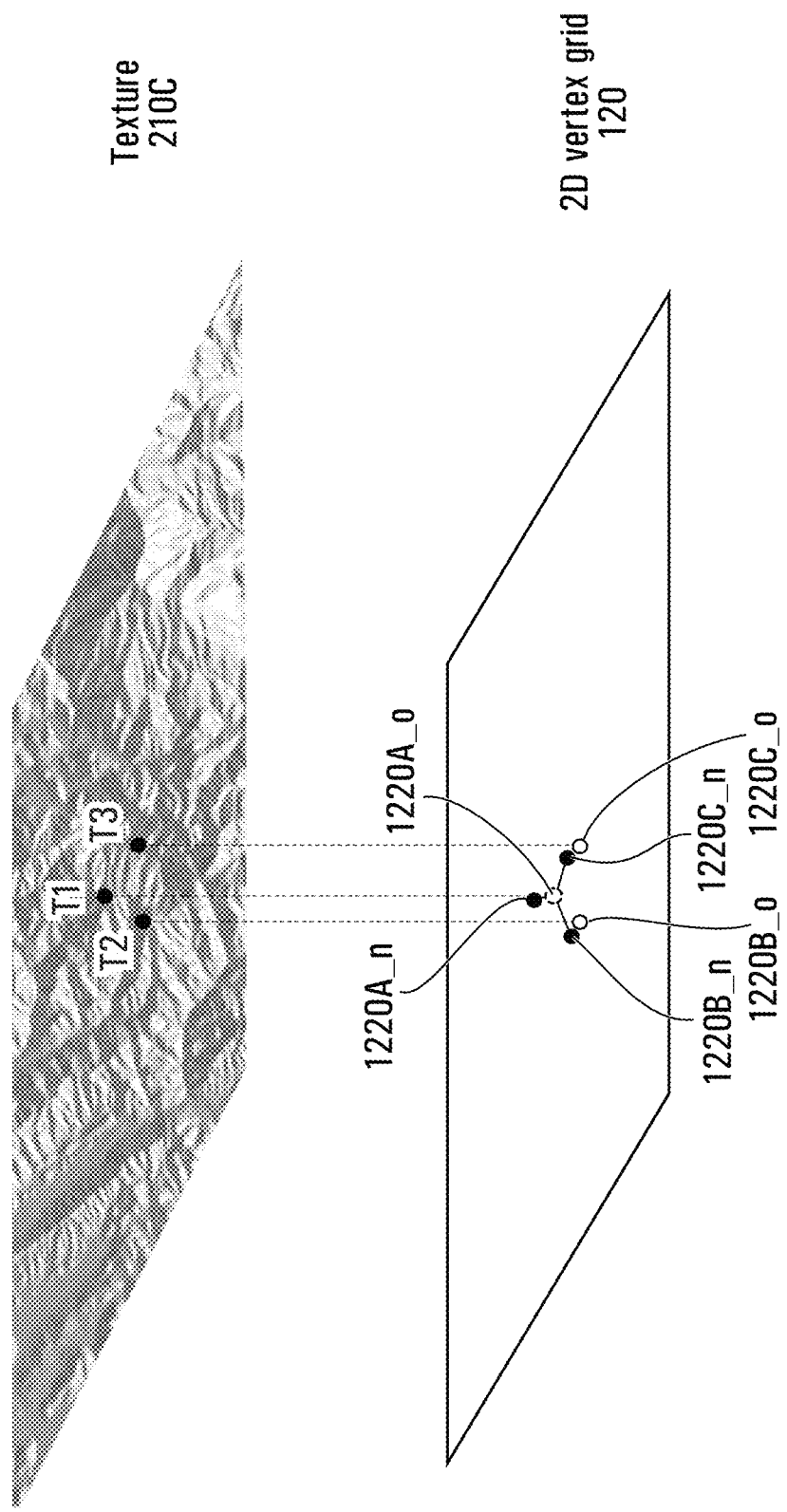
FIG. 13 is a diagram displaying texture coordinates corresponding to the former positions of the vertices in the surrounding subset of vertices shown in FIG. 12.
Figure 14:
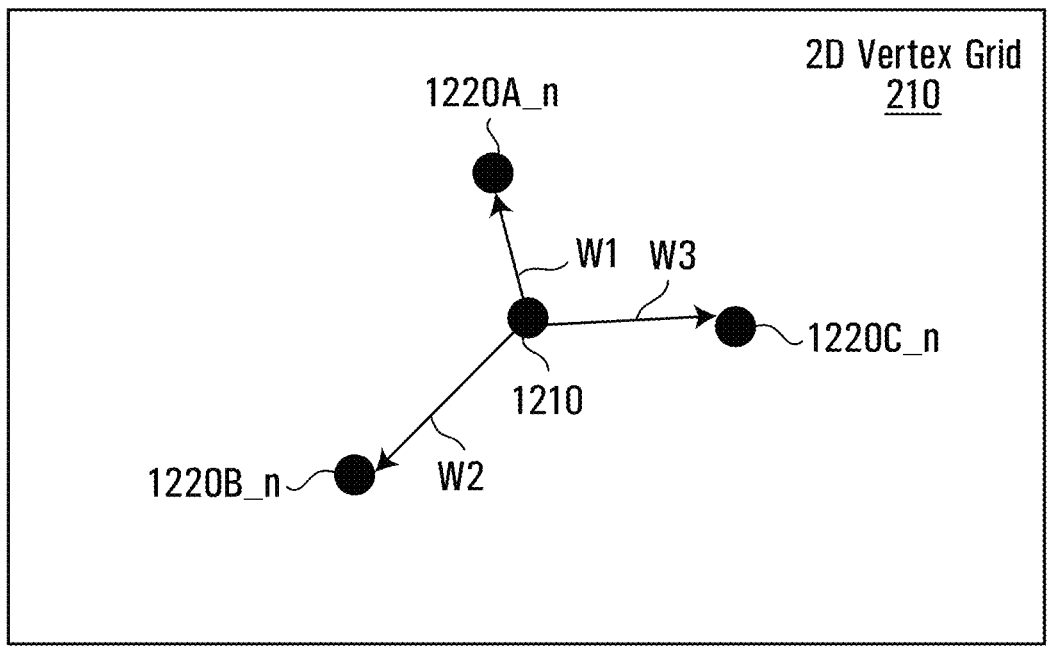
FIG. 14 is a diagram showing the position of the given vertex relative to the positions of the vertices in the surrounding subset of vertices shown in FIG. 12.
Figure 15:
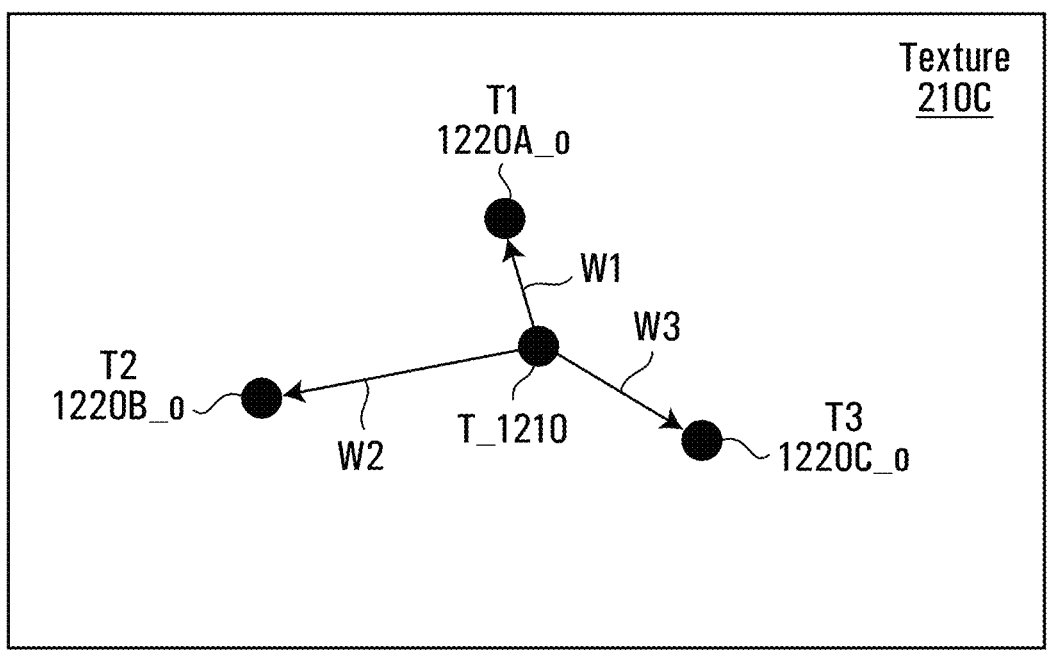
FIG. 15 is a diagram showing the position of the texture coordinates that an implicit mapping would have mapped to the former positions of the vertices in the surrounding subset of vertices shown in FIG. 12, as well as the position of the resultant texture coordinate that is a weighted sum of the aforementioned texture coordinates, in accordance with a non-limiting embodiment.

FIG. 13 denotes by 1220A_o, 1220B_o, 1220C_o the vertices in the original set of vertices 410 corresponding to the three vertices 1220A_n, 1220B_n, 1220C_n in the "corresponding subset" of vertices for the given vertex 1210 (this correspondence is also shown in FIG. 9). It is noted that, in this example, vertices 1220B_o and 1220C_o in the original set of vertices 410 have changed X-Y positions in becoming vertices 1220B_n and 1220C_n, respectively, in the new set of vertices 810. However, vertex 1220A_o has not moved; as such, vertex 1220A_o in the original set of vertices 410 is at the same X-Y coordinates as vertex 1220A_n in the new set of vertices 810. Also, it is noted that vertex 1220A_o is actually vertex 1210, meaning that the moved version of the given vertex 1210 (namely 1220A_n) is one of the vertices that was considered to surround the old version of the given vertex 1210 (namely 1220A_o). This does not always need to be the case for all given vertices, however.

FIG. 13 also shows the texture coordinates T1, T2, T3 associated with vertices 1220A_o, 1220B_o, 1220C_o in the original set of vertices 410. The texture coordinates T1, T2, T3 are obtained by way of an implicit mapping between the texture 210C and the original set of vertices 410.

Sub-Step 520C

In this sub-step, the texture coordinates obtained at sub-step 520B (in this case, T1, T2, T3) are combined to obtain texture coordinates for the given vertex 1210 in the original set of vertices 410. This could include a weighted combination:

$$T\_1210 = \text{Sum}_{i=1:3}(W_i * T_i),$$

where the weights W1, W2, W3 are related to the position of vertex 1210 relative to 1220A_n, 1220B_n, 1220C_n. More particularly, the weights are selected so that in case the vertex 1210 is closer to, say, vertex 1220A_n, than any other vertex, this will make texture coordinate T1 dominant, and so on. For example, in one embodiment, the weights W1, W3 and W3 are selected to be the barycentric coordinates of vertex 1210 within the two-dimensional triangle 1220A_n, 1220B_n, 1220C_n. In another embodiment, the weights W1, W3 and W3 may be selected to be inversely related to the distance between the vertex 1210 and the corresponding vertex 1220A_n, 1220B_n, 1220C_n. Another way to state this is that the weights are the weights for which vertex 1210 in the original set of vertices 410 is the centroid of a polygon (in this case, a triangle) formed by the vertices 1220A_n, 1220B_n, 1220C_n in the corresponding subset of the new set of vertices 810.

Figure 16:
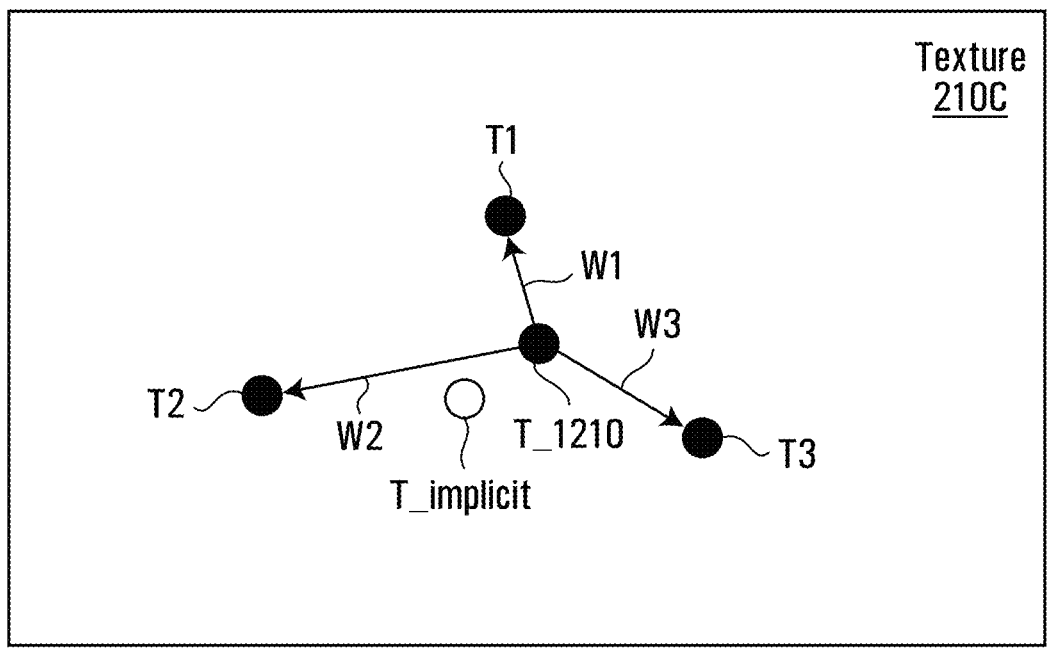
FIG. 16 is a diagram showing the texture coordinate that an implicit mapping would map to the given vertex relative to the resultant texture coordinate, in accordance with a non-limiting embodiment.

The obtained texture coordinate T_1210 is the new texture coordinate for the given vertex 1210 in the old set of vertices 410, and does not necessarily correspond to the texture coordinate that would have been obtained using a linear transformation of the coordinates of the given vertex 1210 in the 2D vertex grid 120. These differences are illustrated in FIG. 16, where T_implicit represents the texture coordinate that would have been obtained by applying an inverse of the implicit mapping (FIG. 3) to the given vertex 1210.

The above sub-steps 520A, 520B, 520C are then carried out for all vertices in the original set of vertices 410, to obtain the texture coordinate in the texture 210C for each such vertex in the original set of vertices 410. As such, there is an individual association between vertices and texture coordinates. This association can be stored in memory as a vertex attribute. The vertex attribute for a particular vertex may include the actual texture coordinate or it may include the difference between the texture coordinate that would be obtained using the implicit mapping and the new texture coordinate, so that the range of values is smaller and can be compressed more effectively. In another embodiment, the new texture coordinates for the various vertices collectively define, in effect, a new texture. In a non-limiting example, the vertex attributes may be recomputed according to the above whenever the terrain heightmap is changed.

Figure 17:
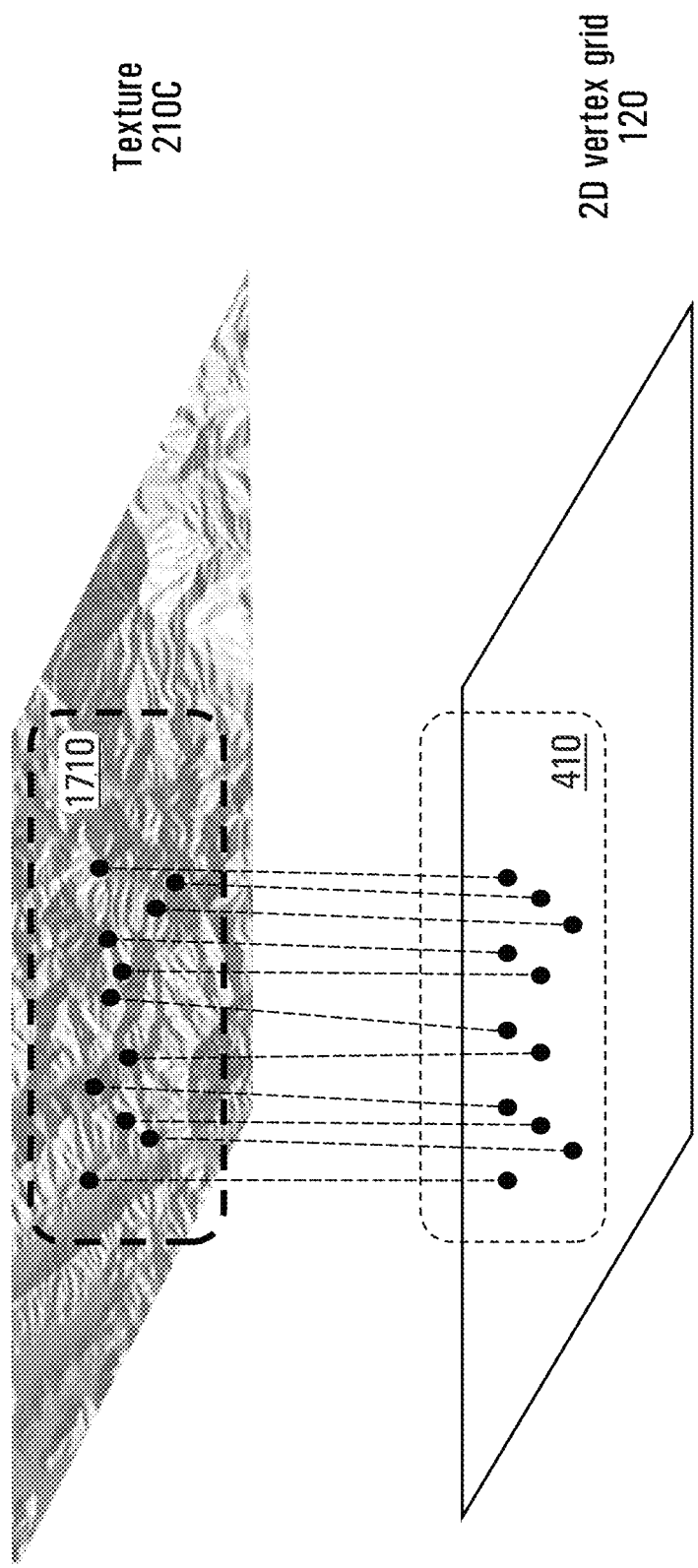
FIG. 17 is a diagram conceptually showing the non-implicitness of a mapping between a texture and a 2D vertex grid, as would be obtained in accordance with a non-limiting embodiment.

FIG. 17 illustrates conceptually the effect of how the texture 210C maps to the vertices in the original set of vertices 410 (which are in the 2D vertex grid 120). It can be observed that the resulting mapping differs from an implicit mapping (even though the implicit mapping may have been used in the process). In particular, the mapping resulting from the presently disclosed technique consists of non-parallel lines at various angles joining corresponding pairs of points in the texture 210C and the 2D vertex grid 120.

Figure 18A:
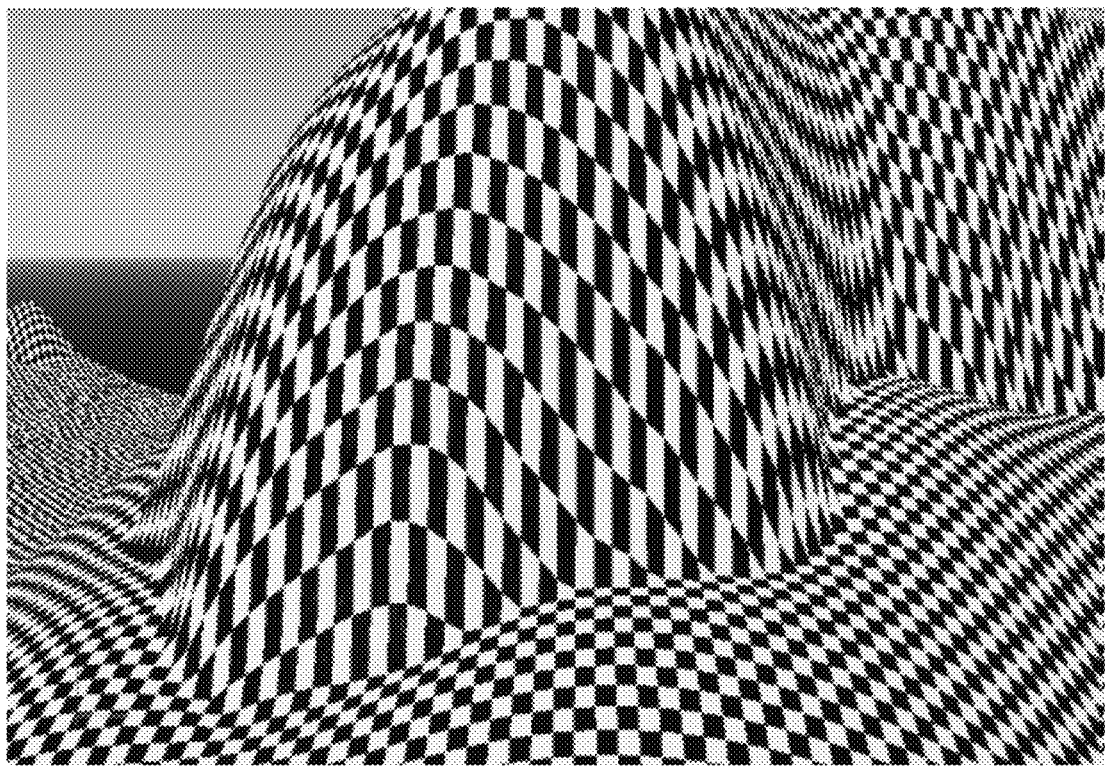
FIG. 18A illustrates a direct projection technique on a 3D terrain mesh.
Figure 18B:
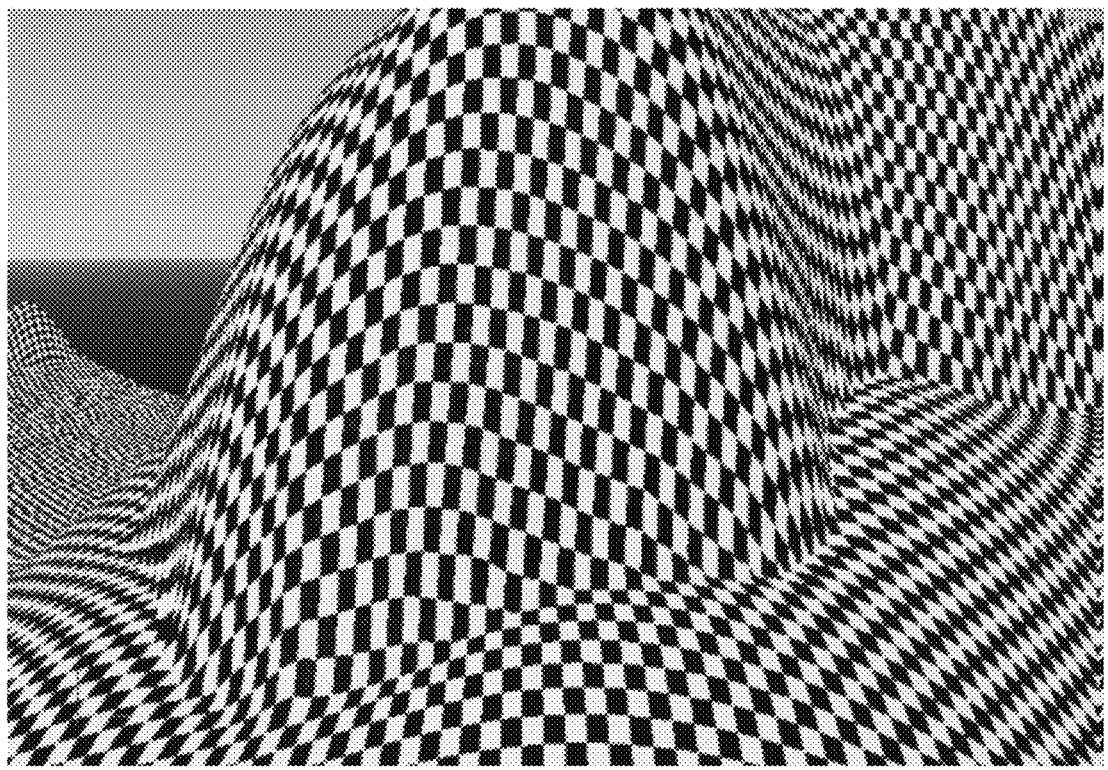
FIG. 18B illustrates the possible outcome of using certain methods disclosed herein on the same 3D terrain mesh as in FIG. 18A, showing less stretching in high-slope areas.

FIG. 18A shows the result of rendering a 3D terrain mesh with a tiled texture using an implicit mapping, whereas FIG. 18B shows the result of rendering the same 3D terrain mesh with the same tiled texture, but using a mapping in accordance with the techniques disclosed herein. One observes less pronounced stretching in the high-sloped areas.

Thus a computer-implemented graphics processing method has been provided. In accordance with this method, an original set of vertices of a terrain mesh is provided, and a new set of vertices is produced from the original set of vertices. Then, for a given vertex in the original set of vertices: (i) texture coordinates are obtained for vertices in a subset of vertices in the new set of vertices that corresponds to the given vertex in the original set of vertices; and (ii) the obtained texture coordinates are combined to obtain a texture coordinate for the given vertex in the original set of vertices. Consider now that a mapping (e.g., an implicit mapping) is provided that associates texture coordinates with the original set of vertices. In that case, to obtain texture coordinates for vertices in the corresponding subset of the new set of vertices, one may proceed by (i) obtaining vertices in the original set of vertices that correspond to the vertices in the corresponding subset of the new set of vertices; and (ii) obtaining those texture coordinates that the mapping associates with the vertices obtained in (i). The combining may include determining a weighted sum of the obtained texture coordinates, and the weights may be the weights for which the given vertex in the original set of vertices is the centroid of a polygon formed by the corresponding vertices in the new set of vertices.

Various operational embodiments are provided herein, including embodiments in which one or more of the operations described may correspond to computer readable instructions stored on one or more computer readable media, which if executed by a computing device (including a central processing unit, a specialized graphics processing unit (GPU) and/or a texture mapping unit (TMU)), will cause the computing device to perform the operations described.

Figure 19:
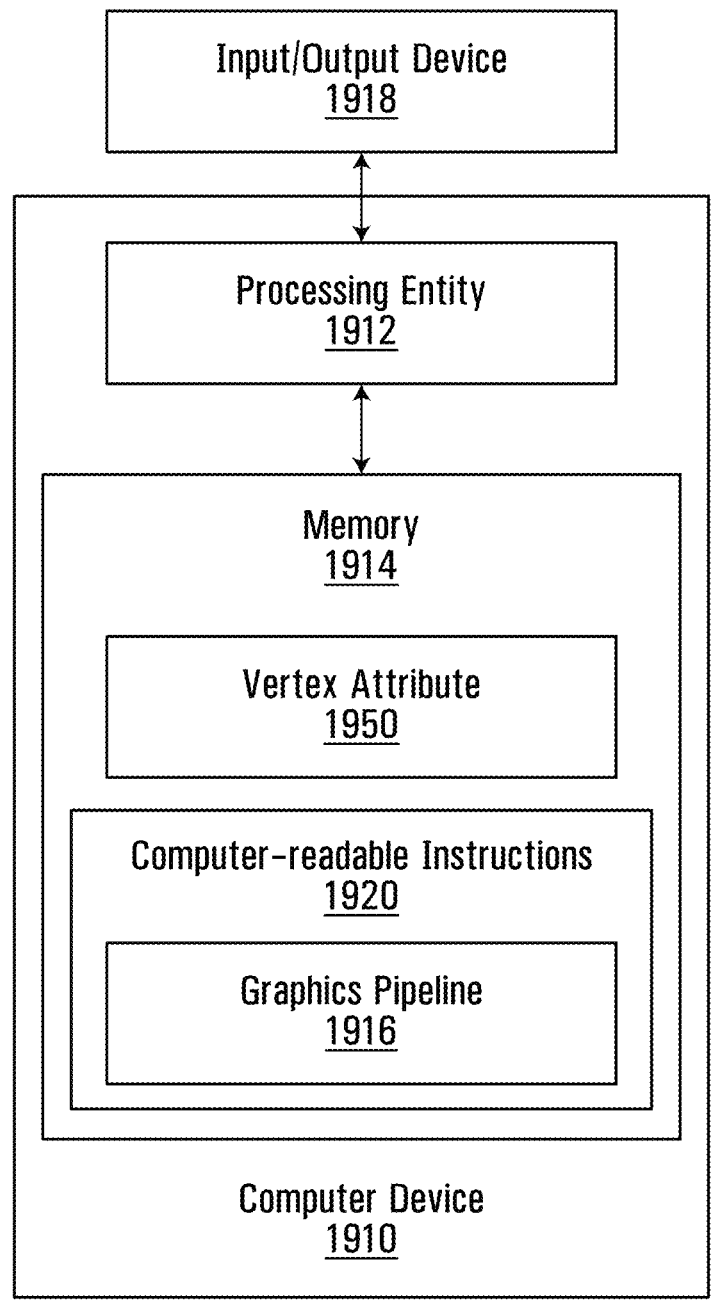
FIG. 19 illustrates certain components of a computing device for carrying out certain methods disclosed herein.

For example, and with reference to FIG. 19, the computing device 1910 includes a processing entity 1912 and a memory 1914 that stores computer-readable instructions 1920. The memory 1914 may be implemented in a variety of ways, such as a magnetic disk, or solid state memory, and may include flash memory, SRAM, DRAM, phase-change memory and the like. The processing entity 1912 is configured to execute the computer-readable instructions in the memory 1914. In doing so, the processing entity 1912 of the computing device 1910 causes the computing device 1910 to implement a graphics pipeline. Examples of a processing entity may include electronic components such as a computer processor on a microchip. The graphics pipeline may be encoded as a subset 1916 of the computer-readable instructions 1920 in the memory 1914. An input/output (I/O) 1918 enables the processing entity 1912 to communicate externally and may include a screen (e.g., touchscreen), keyboard/mouse, network interface device/card (e.g., to support NFC, WiFi, Ethernet or cellular/GSM/LTE communications), USB port(s), etc.

As such, in a particular non-limiting implementation, Step 510 may be performed by a vertex relaxation module defined by first computer-readable instructions in the subset 1916, for execution by the processing entity 1912 (such as a CPU or GPU), whereas Step 520 may be implemented by a texture mapping module defined by second computer-readable instructions in the subset 1916, for execution by the processing entity 1912. In other implementations, the vertex relaxation module and the texture mapping module may be one and the same. The processing entity 1912 is provided with inputs such as the original set of vertices 410, the texture 210C and the heightmap 130, and produces an output which is a vertex attribute 1950 for each vertex in the terrain mesh 110, the vertex attribute being a set of texture coordinates (or a difference), and being stored in the memory 1914.

Components of the computing device 1910, such as the processing entity 1912 and the memory 1914 and various other input and other output devices, may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of the computing device 1910 may be interconnected by a network. For example, the memory 1914 may be comprised of multiple physical memory units located in different physical locations interconnected by a network. Moreover, depending on the exact device configuration and type, the memory 1914 may be volatile (such as RAM, for example), non-volatile (such as ROM, flash memory, etc., for example) or some combination of the two. The computer readable instructions stored in the memory 1914 may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Furthermore, the order in which some or all of the operations are described should not be construed as to imply that these operations are necessarily order-dependent. Alternative ordering will be appreciated by one skilled in the art having the benefit of this description. Further, it will be understood that not all operations are necessarily present in each embodiment provided herein.

Finally, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A computer-implemented graphics processing method by a processor of a computing entity, the method comprising:

providing, by the processor, an original set of vertices of a terrain mesh;

computing a revised two-dimensional (2D) position for at least some vertices the original set of vertices, thereby producing a new set of vertices from the original set of vertices, wherein for each sub-group of a plurality of sub-groups of vertices in the original set of vertices, the computing is carried out in parallel for the vertices in that sub-group and the vertices in that sub-group are selected to exclude any vertices having an influence on the revised 2D position of one or more vertices in that sub-group; and for a given vertex in the original set of vertices:
obtaining texture coordinates for vertices in a corresponding subset of the new set of vertices; and
combining the obtained texture coordinates for the vertices in the corresponding subset of the new set of vertices to obtain a texture coordinate for the given vertex.

2. The computer-implemented graphics processing method defined in claim 1, further comprising identifying the vertices in the corresponding subset of the new subset of vertices.

3. The computer-implemented graphics processing method defined in claim 2, further comprising carrying out the identifying, obtaining and combining for multiple given vertices in the original set of vertices.

4. The computer-implemented graphics processing method defined in claim 2, further comprising carrying out the identifying, obtaining and combining for each vertex in the original set of vertices.

5. The computer-implemented graphics processing method defined in claim 2, further comprising carrying out the producing a predetermined number of times before carrying out the obtaining or combining.

6. The computer-implemented graphics processing method defined in claim 2, further comprising, before carrying out the identifying, obtaining or combining, repeatedly carrying out the producing until, for at least a threshold minimum percentage of vertices in the original set of vertices, the revised 2D position changes by no more than a threshold maximum percent distance.

7. The computer-implemented graphics processing method defined in claim 6, wherein the threshold maximum percent distance is no greater than 10% and wherein the threshold minimum percentage of vertices is no less than 90%.

8. The computer-implemented graphics processing method defined in claim 2, wherein the corresponding subset of the new set of vertices includes L vertices, wherein L is an integer at least as great as 3.

9. The computer-implemented graphics processing method defined in claim 2, wherein the corresponding subset of the new set of vertices includes L vertices in the new set of vertices surrounding the given vertex, wherein L is an integer at least as great as 3.

10. The computer-implemented graphics processing method defined in claim 2, wherein the corresponding subset of the new set of vertices includes the L vertices in the new set of vertices closest to the given vertex, wherein L is an integer at least as great as 3.

11. The computer-implemented graphics processing method defined in claim 1, wherein the revised 2D position is different than an original 2D position, for the at least some vertices in the original set of vertices.

12. The computer-implemented graphics processing method defined in claim 1, further comprising providing a heightmap, wherein the revised 2D position for a particular vertex in the original set of vertices is computed based on a distance between a three-dimensional (3D) point for the particular vertex and N 3D points for N neighboring vertices in the original set of vertices, wherein the 3D points for the N neighboring vertices have a height obtained from the heightmap.

13. The computer-implemented graphics processing method defined in claim 12, wherein N is an integer at least as great as 2.

14. The computer-implemented graphics processing method defined in claim 12, wherein the revised 2D position for the particular vertex in the original set of vertices is based on a sum of vectors joining the 3D point for the particular vertex and the N 3D points for the N neighboring vertices.

15. The computer-implemented graphics processing method defined in claim 14, wherein said N neighboring vertices are those N vertices having smallest 2D distances to the particular vertex.

16. The computer-implemented graphics processing method defined in claim 12, wherein the heightmap is divided into patches so as to define corner vertices and edge vertices between the patches, wherein producing the new set of vertices from the original set of vertices further comprises keeping the corner vertices in the old set of vertices at a same 2D position in the new set of vertices.

17. The computer-implemented graphics processing method defined in claim 16, wherein producing the new set of vertices from the original set of vertices further comprises constraining the edge vertices that are on an edge between the patches to remain on said edge in the new set of vertices.

18. The computer-implemented graphics processing method defined in claim 12, wherein producing the new set of vertices from the original set of vertices comprises repositioning the at least some vertices in the original set of vertices in 2D so as to render distances between neighboring 3D points obtained from vertices in the new set of vertices and the heightmap more uniform than distances between neighboring 3D points obtained from vertices in the original set of vertices and the heightmap.

19. The computer-implemented graphics processing method defined in claim 1, wherein the producing is carried out for a first sub-group of 1/M of vertices in the original set of vertices, and then for a second sub-group of 1/M of the vertices in the original set of vertices, and so on, until the Mth sub-group of 1/M of the vertices in the original set of vertices.

20. The computer-implemented graphics processing method defined in claim 19, wherein M is a positive integer greater than or equal to 2.

21. The computer-implemented graphics processing method defined in claim 1, further comprising carrying out the producing multiple times first before carrying out the obtaining or combining.

22. The computer-implemented graphics processing method defined in claim 1, further comprising providing a mapping that associates texture coordinates with the original set of vertices, wherein obtaining the texture coordinates for the vertices in the corresponding subset of the new set of vertices comprises (i) obtaining vertices in the original set of vertices that correspond to the vertices in the corresponding subset of the new set of vertices; and (ii) obtaining those texture coordinates that the mapping associates with the obtained vertices in the original set of vertices in (i).

23. The computer-implemented graphics processing method defined in claim 22, wherein the mapping is an implicit mapping.

24. The computer-implemented graphics processing method defined in claim 1, wherein combining the obtained texture coordinates for the vertices in the corresponding subset of the new set of vertices to obtain the texture coordinate for the given vertex comprises determining a weighted sum of the obtained texture coordinates for the vertices in the corresponding subset of the new set of vertices.

25. The computer-implemented graphics processing method defined in claim 24, further comprising determining a weight for each of the obtained texture coordinates for the vertices in the corresponding subset of the new set of vertices.

26. The computer-implemented graphics processing method defined in claim 25, wherein the weight is computed based on relative positions of the given vertex in the original set of vertices and each of the vertices in the corresponding subset of the new set of vertices.

27. The computer-implemented graphics processing method defined in claim 25, wherein the weight for each of the obtained texture coordinates for the vertices in the corresponding subset of the new set of vertices are weights for which the given vertex in the original set of vertices is a centroid of a polygon formed by the vertices in the corresponding subset of the new set of vertices.

28. The computer-implemented graphics processing method defined in claim 1, further comprising storing information regarding the texture coordinate for each given vertex as a vertex attribute of the given vertex.

29. The computer-implemented graphics processing method defined in claim 1, further comprising (i) providing a mapping that associates texture coordinates with the original set of vertices; and (ii) storing, in association with the given vertex, difference information between the obtained texture coordinate for the given vertex and an initial texture coordinate that the mapping associates with the given vertex.

30. A non-transitory computer-readable storage medium storing an original set of vertices and computer-readable instructions which, when executed by a processor of a computing entity, cause the computing entity to carry out a method that comprises:
providing the original set of vertices of a terrain mesh;
computing a revised two-dimensional (2D) position for at least some vertices in the original set of vertices, thereby producing a new set of vertices from the original set of vertices, wherein for each sub-group of a plurality of sub-groups of vertices in the original set of vertices, the computing is carried out in parallel for the vertices in that sub-group and the vertices in that sub-group are selected to exclude any vertices having an influence on the revised 2D position of one or more vertices in that sub-group; and
for a given vertex in the original set of vertices:
obtaining texture coordinates for vertices in a corresponding subset of the new set of vertices; and
combining the obtained texture coordinates for the vertices in the corresponding subset of the new set of vertices to obtain a texture coordinate for the given vertex.

31. A computer-implemented graphics processing method performed by a processor of a computing entity, the method comprising:
providing, by the processor, an original set of vertices of a terrain mesh;
producing a new set of vertices from the original set of vertices, wherein producing the new set of vertices from the original set of vertices comprises computing a revised two-dimensional (2D) position for at least some vertices in the original set of vertices; and
for a given vertex in the original set of vertices:
obtaining texture coordinates for vertices in a corresponding subset of the new set of vertices;
combining the obtained texture coordinates for the vertices in the corresponding subset of the new set of vertices to obtain a texture coordinate for the given vertex; and
identifying the vertices in the corresponding subset of the new subset of vertices,
wherein before carrying out the identifying, obtaining or combining, repeatedly carrying out the producing, until, for at least a threshold minimum percentage of vertices in the original set of vertices, the revised 2D position changes by no more than a threshold amount.

32. The computer-implemented graphics processing method of claim 31, wherein the threshold amount is a distance in three-dimensional (3D) space.

33. The computer-implemented graphics processing method of claim 32, wherein the threshold minimum percentage of vertices is no less than 90%.

34. The computer-implemented graphics processing method defined in claim 31, wherein the threshold amount is a threshold maximum percent distance.

35. The computer-implemented graphics processing method defined in claim 34, wherein the threshold maximum percent distance is no greater than 10% and wherein the threshold minimum percentage of vertices is no less than 90%.

36. A non-transitory computer-readable storage medium storing an original set of vertices and computer-readable instructions which, when executed by a processor of a computing entity, cause the computing entity to carry out a method that comprises:
providing the original set of vertices of a terrain mesh;
producing a new set of vertices from the original set of vertices, wherein producing the new set of vertices from the original set of vertices comprises computing a revised two-dimensional (2D) position for at least some vertices in the original set of vertices; and
for a given vertex in the original set of vertices:
obtaining texture coordinates for vertices in a corresponding subset of the new set of vertices;
combining the obtained texture coordinates for the vertices in the corresponding subset of the new set of vertices to obtain a texture coordinate for the given vertex; and
identifying the vertices in the corresponding subset of the new subset of vertices,
wherein, before carrying out the identifying, obtaining or combining, repeatedly carrying out the producing, until, for at least a threshold minimum percentage of vertices in the original set of vertices, the revised 2D position changes by no more than a threshold amount.

* * * * *